(12) United States Patent
Sullivan

(10) Patent No.: US 11,453,038 B2
(45) Date of Patent: Sep. 27, 2022

(54) ALIGNING CAP FOR CONDUITS

(71) Applicant: Ryan Sullivan, Andover, MA (US)

(72) Inventor: Ryan Sullivan, Andover, MA (US)

( * ) Notice: Subject to any disclaimer, the term of this patent is extended or adjusted under 35 U.S.C. 154(b) by 70 days.

(21) Appl. No.: 17/225,889

(22) Filed: Apr. 8, 2021

(65) Prior Publication Data
US 2021/0220893 A1 Jul. 22, 2021

Related U.S. Application Data

(60) Provisional application No. 63/118,849, filed on Nov. 27, 2020.

(51) Int. Cl.
*G01C 9/28* (2006.01)
*B21D 7/16* (2006.01)
*G01C 9/34* (2006.01)
*B21D 7/14* (2006.01)

(52) U.S. Cl.
CPC .............. *B21D 7/16* (2013.01); *B21D 7/14* (2013.01); *G01C 9/28* (2013.01); *G01C 9/34* (2013.01)

(58) Field of Classification Search
CPC ....................................................... G01C 9/28
USPC ........................................... 33/371, 372, 373
See application file for complete search history.

(56) References Cited

U.S. PATENT DOCUMENTS

| | | | | |
|---|---|---|---|---|
| 2,469,795 A * | 5/1949 | Sproul | .................. | G03B 17/12 33/371 |
| 3,188,748 A * | 6/1965 | Willard | ............... | E04G 21/1841 33/390 |
| D220,124 S * | 3/1971 | Powell | ..................... | G01C 9/32 D10/69 |
| 3,826,013 A * | 7/1974 | Baher | ...................... | G01C 9/24 D10/69 |
| 4,168,578 A * | 9/1979 | VanderWerf | ............. | G01C 9/28 33/382 |
| 4,785,544 A * | 11/1988 | Heinsius | ............... | B25H 1/0085 33/372 |
| 4,908,949 A * | 3/1990 | Jaccard | ..................... | A61C 1/08 33/372 |
| 5,167,075 A * | 12/1992 | Weldy | ...................... | G01C 9/34 33/343 |
| 5,207,004 A * | 5/1993 | Gruetzmacher | ......... | G01C 9/28 33/379 |
| 5,253,425 A * | 10/1993 | Wozniak | ................... | G01C 9/28 33/642 |
| 5,421,094 A * | 6/1995 | McCord | ................... | G01C 9/28 33/388 |
| 5,568,265 A * | 10/1996 | Matthews | .............. | G01B 11/27 356/138 |
| 6,029,359 A * | 2/2000 | Szumer | .................... | G01C 9/28 33/465 |
| 6,502,322 B2 * | 1/2003 | Smochek | ................. | G01C 9/26 33/373 |
| 6,532,676 B2 * | 3/2003 | Cunningham | ....... | G01C 15/008 33/286 |

(Continued)

*Primary Examiner* — George B Bennett
(74) *Attorney, Agent, or Firm* — Barry Choobin; Patent 360

(57) ABSTRACT

An aligning device that can be mounted to a conduit for rotating the conduit in successive angular intervals. The aligning device having a bracket that can be secured to the conduit. The bracket having four bubble levels at its periphery equally spaced from each other. Each bubble level can be horizontally leveled.

10 Claims, 2 Drawing Sheets

(56) References Cited

U.S. PATENT DOCUMENTS

| | | | | |
|---|---|---|---|---|
| 6,748,665 | B1* | 6/2004 | Samp | G01C 9/32 |
| | | | | 33/348.2 |
| 6,834,435 | B2* | 12/2004 | Turner | G01C 9/28 |
| | | | | 33/529 |
| 7,536,798 | B2* | 5/2009 | Silberberg | G01C 9/34 |
| | | | | 33/379 |
| 7,669,342 | B1* | 3/2010 | Crain | G01C 9/28 |
| | | | | 33/372 |
| 7,676,940 | B2* | 3/2010 | Spaulding | G01C 9/28 |
| | | | | 33/383 |
| 7,802,370 | B2* | 9/2010 | Lewry | G01B 13/19 |
| | | | | 33/333 |
| 9,926,722 | B2* | 3/2018 | Corgat | E04H 17/263 |
| D906,467 | S* | 12/2020 | McCoy, II | G01C 9/28 |
| | | | | D22/109 |
| 2015/0059194 | A1* | 3/2015 | Esposito | F16B 2/08 |
| | | | | 33/290 |
| 2020/0094381 | A1* | 3/2020 | Molina | B25B 5/003 |

* cited by examiner

ALIGNING CAP FOR CONDUITS

CROSS-REFERENCE TO RELATED APPLICATIONS

This application claims priority to the U.S. provisional patent application Ser. No. 63/118,849, filed on Nov. 27, 2020, which is incorporated herein by reference in its entirety.

FIELD OF INVENTION

The present invention relates to an aligning cap for conduits, and in particular, the present invention relates to an aligning cap having multiple bubble levels for precise rotation of conduits.

BACKGROUND

Conduits are used to transfer fluids or may act as protective housing for cables and like. A need often arises when a conduit has to be bent. For example, to make a turn or climb a barrier in the path of the conduit. Rigid conduits, such as steel pipes have to be bend at specific angles and may be bent at more than one point. Pipe or tube benders are available which has a scale for precise bending of a conduit to a specific angle. However, for the second bend, the conduit itself has to be at a specific angle relative to the adjacent bent.

For example, to climb a barrier in the path of the conduit, the conduit has to be bent twice. Using the known tube benders, the conduit can be bent to a specific angle but for the second bend, the conduit has to be rotated 180 degrees and a second bend can be made. Generally, a person relies on his skills for precisely rotating the conduit. However, often, the angles can be misjudged, and mistakes made.

A need is there for an aligning device that can allow rotating a conduit at specific angles.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an aligning device for conduits that allow the conduit to be rotated by specific angles.

It is another object of the present invention that the aligning device can be compact and portable.

It is still another object of the present invention that the aligning device is economical to manufacture.

It is a further object of the present invention that the aligning device can be quickly installed and removed from the conduit.

It is yet another object of the present invention that the aligning device can be used independently from the tube bender.

In one aspect, disclosed is an aligning device having a bracket to fixedly and removably mount to a conduit. The bracket having at least four bubble levels equally spaced from each other, such as a conduit can be rotated in 90-degree intervals.

In one aspect, the bracket is having a central threaded groove that permits the aligning device to be fastened to a conduit.

In one aspect, the disclosed aligning device can have an adaptor that allows the aligning device to fit onto conduits of varying widths.

In one aspect, the aligning device can include two concentric rings, the outer rings having the four bubble levels equally spaced from each other. The inner rings adapted to mount to a conduit, wherein the inner rings can fit onto conduits of varying diameters. The inner rings can be coupled to the outer ring through rigid spokes that prevent vibrations in the bubble levels.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
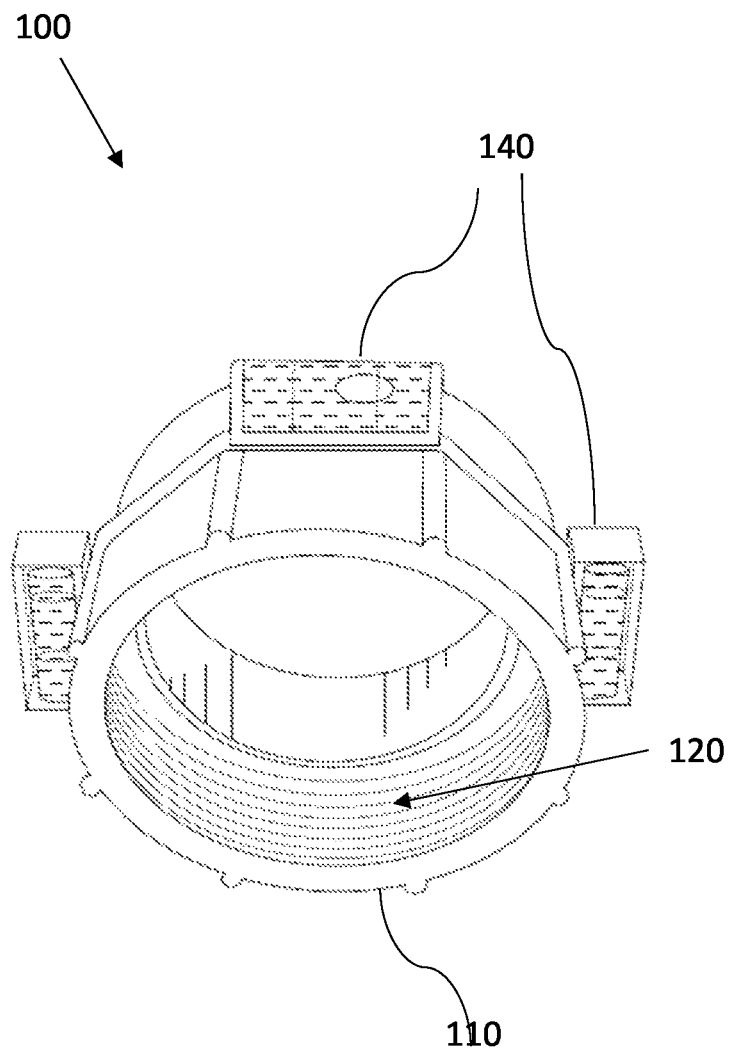
FIG. 1 is a perspective view of the disclosed aligning device, according to an exemplary embodiment of the present invention.

Disclosed is an aligning device for precisely rotating a conduit at specific angular intervals, preferably 90 degrees. Referring to FIG. 1, which shows an exemplary embodiment of the aligning device 100 having a bracket 110 which is similar to a round cap. The bracket 110 can have a threaded groove 120 at its center that allows the bracket to threadedly fastened to a tip of a conduit. The bracket can be mounted to a conduit like a cap. The bracket in FIG. 1 is shown to be round, however, the brackets having four or more sides are within the scope of the present invention. For example, the bracket can be of a polygonal shape. Also, it can be seen in FIG. 1 are the four bubble levels 140 along the periphery of the bracket 110. The four bubble levels 140 are spaced equally from each other, i.e., each bubble level is at a 90 degrees angular distance from the adjacent two bubble levels. Each bubble level is positioned such as the longitudinal axis of the bubble level can be perpendicular to the length of the conduit. Or the longitudinal axis of the bubble level is in the plain of the bracket. Each bubble level can shave suitable marking that can be aligned with the air bubble for leveling the bubble level horizontally.

To bend a conduit, first, the disclosed aligning device can be secured to a suitable end of the conduit, preferably the end that is above. Then, the conduit can be engaged into the tube bender. Thereafter, the conduit can be rotated such as one bubble level is at the top and horizontally leveled. Thereafter, the conduit can be bend at the desired point. To make the next bend in the conduit, the conduit can be rotated to the next level i.e., 90 degrees. The next bubble reaches the top and can then be horizontally aligned. Alternatively, the conduit can be rotated 180 degrees at once, wherein the bubble level at the bottom is rotated up to the top, which can then be horizontally leveled by rotating the conduit. To make two offset bends for climbing a barrier, the conduit can be rotated 180 degrees and the second bend can be made. It is to be understood that FIG. 1 shows four bubble level indicators, more than four bubble level indicators are within the scope of the present invention. For example, eight bubble levels can be spaced equally around the bracket, each bubble level at a 30 degrees angular distance from the adjacent two bubble levels. An odd number of bubble levels, such as three can allow rotating the conduit in intervals of 120 degrees.

Figure 2:
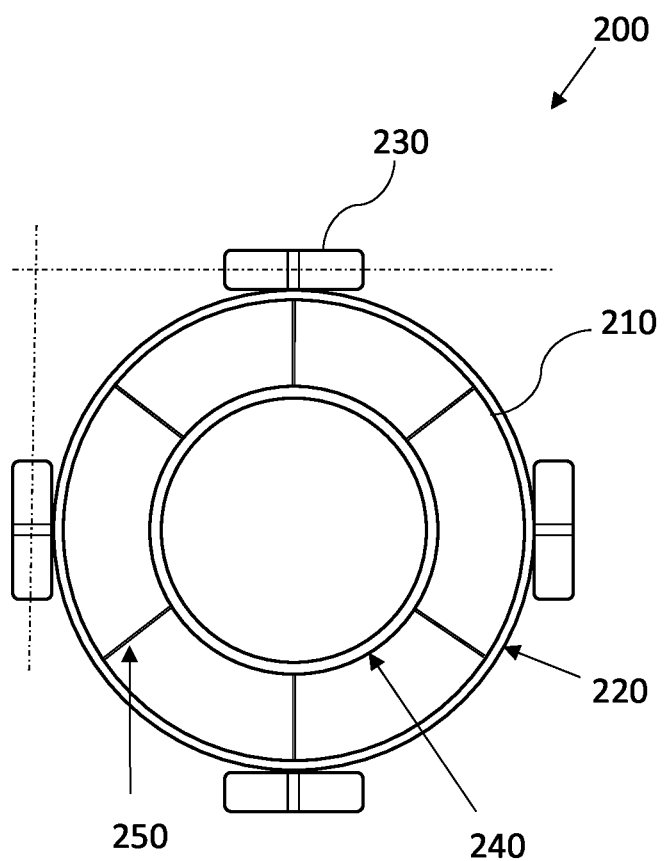
FIG. 2 shows another exemplary embodiment of the disclosed aligning device, according to the present invention.

Referring to FIG. 2, which shows an alternate embodiment of the aligning device 200. The outer periphery 220 of the bracket 210 can having the four bubble levels 230 equally spaced is a critical part of the disclosed aligning device. The inner fastening area 240 can be modified, such as the same aligning device can fit on to different conduits having different diameters. In one case, the bracket can in the form of two concentric rings joined to each other through multiple spokes 250. The outer rings and the spokes can be rigid that can keep the bubble levels stationary and prevent vibrations. The inner ring can have jaws, clamps, or like that can fit over the conduits of different diameters. The inner ring can slide over the conduit up to the desired point. For example, two opposite clamps joined through elastic straps. The spokes can be attached to the rigid clamp portion.

In one case, the bracket can have a central tunnel that can slide over the conduit. The inner surface of the bracket can be having a layer of rubbery material for the grip. In one case, the bracket can be secured to the tip of the conduit, wherein the bracket can snap-fit or threaded to the conduit. Also, adaptors of different sizes can be provided that can be secured to the conduit and the bracket can then be secured to the adaptor.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An aligning device comprising:
   a bracket configured to mount to a conduit; and
   a plurality of bubble levels coupled to a periphery of the bracket, the plurality of bubble levels equally spaced from each other, each bubble level can be horizontally leveled.

2. The aligning device according to claim 1, wherein the bracket is having a central threaded grove configured to fastened to the conduit.

3. The aligning device according to claim 1, wherein the bracket is having four bubble levels, each bubble level at 90° angular distance from the two adjacent bubble levels, the longitudinal axis of each bubble level is perpendicular to the longitudinal axis of the two adjacent bubble levels.

4. The aligning device according to claim 3, wherein the bracket is having a central tunnel configured to snugly slide over the conduit, an inner surface of the tunnel having a rubbery surface for grip.

5. The aligning device according to claim 3, wherein the bracket is having an inner ring and an outer ring, a plurality of spokes couples the inner ring to the outer ring, the outer ring having the four bubble levels, the inner ring configured to expand for mounting to conduits of different diameters.

6. A method for bending a conduit, the method comprising the steps of:
   providing an aligning device, the aligning device comprises:
      a bracket configured to mount to the conduit, and
      four bubble levels coupled to a periphery of the bracket, the four bubble levels equally spaced from each other, each bubble level can be horizontally leveled, each bubble level at 90° angular distance from the two adjacent bubble levels, the longitudinal axis of each bubble level is perpendicular to the longitudinal axis of the two adjacent bubble levels;
   securing the aligning device to the conduit;
   mounting the conduit to a tube bender;
   rotating one of the four bubble levels to top, the one bubble level aligned horizontally;
   bending the conduit using the tube bender;
   upon bending the conduit, rotating the conduit by 90° or 180°, such as another one bubble level is at the top;
   horizontally leveling the another one bubble level; and
   upon horizontally leveling the another one bubble level, bending the conduit again.

7. The method according to claim 6, wherein the conduit is rotated 180°, and before rotating, the conduit is moved vertically in the tube bender to a new bend point.

8. The method according to claim 6, wherein the bracket is having a central threaded grove configured to fastened to the conduit.

9. The method according to claim 6, wherein the bracket is having a central tunnel configured to snugly slide over the conduit, an inner surface of the tunnel having a rubbery surface for grip.

10. The method according to claim 6, wherein the bracket is having an inner ring and an outer ring, a plurality of spokes couples the inner ring to the outer ring, the outer ring having the four bubble levels, the inner ring configured to expand for mounting to conduits of different diameters.

* * * * *